United States Patent
Li et al.

(10) Patent No.: US 10,991,949 B2
(45) Date of Patent: Apr. 27, 2021

(54) ELECTRODE COMPONENT, ELECTRODE ASSEMBLY AND RECHARGEABLE BATTERY

(71) Applicant: Contemporary Amperex Technology Co., Limited, Ningde (CN)

(72) Inventors: Xiang Li, Ningde (CN); Chengyou Xing, Ningde (CN); Peng Wang, Ningde (CN); Rulai Cai, Ningde (CN)

(73) Assignee: Contemporary Amperex Technology Co., Limited

(*) Notice: Subject to any disclaimer, the term of this patent is extended or adjusted under 35 U.S.C. 154(b) by 168 days.

(21) Appl. No.: 16/227,938

(22) Filed: Dec. 20, 2018

(65) Prior Publication Data
US 2019/0221855 A1    Jul. 18, 2019

(30) Foreign Application Priority Data

Jan. 16, 2018 (CN) .......................... 201810039472.6

(51) Int. Cl.
| | |
|---|---|
| *H01M 2/34* | (2006.01) |
| *H01M 4/13* | (2010.01) |
| *H01M 4/75* | (2006.01) |
| *H01M 4/66* | (2006.01) |
| *H01M 50/54* | (2021.01) |

(Continued)

(52) U.S. Cl.
CPC .............. *H01M 4/75* (2013.01); *H01M 4/13* (2013.01); *H01M 4/667* (2013.01); *H01M 50/54* (2021.01); *H01M 50/572* (2021.01); *H01M 10/052* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2005/0233209 A1 | 10/2005 | Sudano et al. | |
| 2009/0111011 A1* | 4/2009 | Kim .................... | H01M 50/461 |
| | | | 429/133 |

FOREIGN PATENT DOCUMENTS

| | | | |
|---|---|---|---|
| JP | H10255754 | * 9/1998 | ............. Y02E 60/10 |
| WO | WO2012081368 A1 | 6/2012 | |

OTHER PUBLICATIONS

WO2012081368A1—Machine translation (Year: 2012).*
JPH10255754—Machine translation (Year: 1998).*

* cited by examiner

*Primary Examiner* — Haroon S. Sheikh
(74) *Attorney, Agent, or Firm* — Forge IP, PLLC

(57) ABSTRACT

The present disclosure relates to an electrode component, an electrode assembly and a rechargeable battery. The electrode component includes an electrode body, a conductive structure, and a reinforcement structure. The electrode body includes an insulating substrate and a conductive layer disposed on surfaces of the insulating substrate, the conductive layer includes a first portion coated with an active material and a second portion extending from the first portion and uncoated with the active material. The conductive structure is connected to the second portion. The reinforcement structure reinforces the conductive structure on the second portion. According to the present disclosure, by reinforcing the conductive structure connected to the second portion of the electrode component having the insulating substrate by the reinforcing structure, the reliability of the arrangement of the conductive structure on the second portion can be effectively improved.

13 Claims, 6 Drawing Sheets

(51) Int. Cl.
*H01M 50/572* (2021.01)
*H01M 10/052* (2010.01)
*H01M 4/02* (2006.01)

ELECTRODE COMPONENT, ELECTRODE ASSEMBLY AND RECHARGEABLE BATTERY

CROSS-REFERENCE TO RELATED APPLICATIONS

The present application claims priority to Chinese Patent Application No. 201810039472.6, filed on Jan. 16, 2018, the content of which is incorporated herein by reference in its entirety.

TECHNICAL FIELD

The present disclosure relates to the technical field of battery, and in particular, relates to an electrode component, an electrode assembly and a rechargeable battery.

BACKGROUND

Lithium-ion batteries, as a kind of rechargeable battery, are widely used in portable electronic devices such as mobile phones and notebooks, electric vehicles such as electric autos and electric bicycles, because of their characters of high energy density, high power density, great number of cycling, and long storage time.

The electrode components of the lithium-ion battery are usually made of a metal material. For example, a positive electrode component is usually made of aluminum foil, and a negative electrode component is usually made of copper foil. However, in a nailing experiment, burrs produced during a nail penetrating the aluminum foil (or copper foil) may directly touch the negative electrode component (or the positive electrode component), which will cause an internal short circuit in the negative electrode component and the positive electrode component and further lead to firing or explosion of the lithium-ion battery.

SUMMARY

In order to solve the problems during the nailing experiment, the present disclosure develops a novel electrode component without using the aluminum foil or copper foil. As shown in FIGS. 1-2, the novel electrode component 1' includes an insulating substrate 10' and a conductive layer 11' disposed on the surface of the insulating substrate 10'. The conductive layer 11' has a first portion coated with an active material 12' and a second portion that is uncoated with the active material 12' and extends from the first portion. For convenience of description, the first portion and a portion of the insulating substrate 10' corresponding to the first portion are referred to as a current generating portion 14', and the second portion and a portion of the insulating portion 10' corresponding to the second portion are referred to as a current guiding portion 13'. At the time of use, the active material 12' in the current generating portion 14' electrochemically reacts with the electrolytic solution to produce a charge and discharge process, while the current guiding portion 13' is connected to the current collecting component to lead the generated current to the outside. Since the conductive layer 11' disposed on the surface of the insulating substrate 10' has a much smaller thickness than the copper foil and the aluminum foil that are currently used, the burr is unlikely to generate during the nailing, and thus the electrode component can successfully pass the nailing experiment.

However, a plurality of current guiding portions 13' will be involved when forming an electrode assembly by winding or stacking the novel electrode component, and the plurality of current guiding portions 13' are connected to the current collecting component. Due to the existence of the insulating substrate 10', conductive layers 11' located between the plurality of current guiding portions 13' are not in direct contact, which may lead to a poor electrical conductivity (even an insulation from each other), further resulting in an excessive resistance occurring at the junction of the current guiding portions 13' and the current collecting component. Therefore, the temperature may rise sharply during the charging and discharging process. The electrode component and the current collecting component are usually connected by welding (such as ultrasonic welding). However, due to the existence of the insulating substrate in the novel electrode component, welding energy is difficult to penetrate the insulating substrate, so that it is difficult or even impossible to weld the novel electrode component with the current collecting component.

In order to improve the conductivity of the electrode member 1' having the insulating substrate 10', as shown in FIG. 3, a conductive structure 2' is additionally provided to the electrode component 1' shown in FIGS. 1-2. The conductive structure 2' is connected to a second portion of the conductive layer 11' uncoated with the active material 12' such that after the electrode assembly is formed by winding and stacking the electrode components 1', adjacent current guiding portions 13' can be electrically connected by the conductive structure 2 without limitation of the insulating substrate 10', thereby effectively enhancing the electrical conductivity of the electrode component.

However, it has been found through research that the conductive structure 2' of the electrode component 1' shown in FIG. 3 cannot be firmly and reliably arranged on the second portion, and the conductive structure 2', especially a portion outside the connecting sites, can be easily curled up, thereby affecting a normal function of the conductive structure 2' and also increasing the assembly difficulty.

On basis of the above circumstance, a technical problem to be solved by the present disclosure is to improve the reliability of the arrangement of the conductive structure on the electrode component having the insulating substrate.

In order to solve the above technical problem, a first aspect of the present disclosure provides an electrode component. The electrode component includes: an electrode body; a conductive structure; and a reinforcement structure. The electrode body includes an insulating substrate and a conductive layer disposed on the insulating substrate, and the conductive layer includes a first portion coated with an active material, and a second portion extending from the first portion and uncoated with the active material. The conductive structure is connected to the second portion. The reinforcement structure reinforces the conductive structure on the second portion.

Further, an overlapping region is formed between the conductive structure and the second portion, and the reinforcement structure at least partially wraps the overlapping region.

Further, the reinforcement structure is an insulating plastic structure.

Further, the conductive layer is provided on two opposite surfaces of the insulating substrate in a thickness direction of the insulating substrate. The conductive structure includes a first conductive member connected to a part of the second portion disposed on one surface of the insulating substrate, and the reinforcement structure is provided on the first conductive member.

Further, the conductive structure further includes a second conductive member connected to a part of the second portion disposed on the other surface of the insulating substrate, and the reinforcement structure is further provided on the second conductive member.

Further, the electrode component is provided with a through-hole, the through-hole penetrating the conductive structure and the electrode body along a thickness direction, and the reinforcement structure has a portion passing through the through-hole.

A second aspect of the present disclosure provides an electrode assembly. The electrode assembly includes the electrode component according to the present disclosure.

A third aspect of the present disclosure provides an electrode assembly. The electrode assembly includes: a tab; and a reinforcement structure. The tab includes at least two current lead-out units that are stacked together, and each of the at least two current lead-out units includes a current guiding portion and a conductive structure. The current guiding portion includes a conductive portion uncoated with an active material and an insulating portion corresponding to the conductive portion. The conductive structure is connected to the conductive portion. The reinforcement structure is arranged on the conductive structure of at least one of the at least two current lead-out units of the tab, and reinforces the conductive structure on the conductive portion.

Further, an overlapping region is formed between the conductive structure and the conductive portion, and the reinforcement structure at least partially wraps the overlapping region.

Further, all of the at least two current lead-out units of the tab are wrapped by a same reinforcement structure, or the at least two current lead-out units of the tab are divided into at least two groups of current lead-out units, each group of the at least two groups of current lead-out units being wrapped by a different reinforcement structure.

Further, one of the at least two current lead-out units, which corresponds to the conductive structure reinforced by the reinforcement structure, is provided with one or more through-holes, each of the one or more through-holes penetrating the corresponding current lead-out unit along a thickness direction, and the reinforcement structure has a portion passing through one of the one or more through-holes.

Further, the one or more through-holes are at least two through-holes, and the at least two through-holes are arranged in a row and/or a column.

A fourth aspect of the present disclosure provides a rechargeable battery. The rechargeable battery includes the electrode assembly according to the present disclosure.

Embodiments of the present disclosure are described with reference to drawings as follow, aiming to exhibit other features and advantages of the present disclosure.

BRIEF DESCRIPTION OF DRAWINGS

Drawings used to illustrate and elaborate embodiments according to the present disclosure or technical solution in the prior art are briefly described below. It should be understood that the drawings described below are only some of the embodiments of the present disclosure, and those skilled in the art can obtain other drawings based on these without any inventive effort.

REFERENCE SIGNS IN DRAWINGS

1': electrode component; 10': insulating substrate; 11': conductive layer; 12': active material; 13': current guiding portion; 14': current generating portion; 1a': welded portion; 2': conductive structure;

1: electrode body; 10: insulating substrate; 11: conductive layer; 12: active material; 13: current guiding portion; 14: current generating portion; 1a: first welded portion; 13a: through-hole; G: gap;

2: conductive structure; 21a: first conductive component; 21b: second conductive component; 22: conductive connecting portion;

3: reinforcement structure;

100: electrode assembly; 200: current collecting component; 300: top cover; 400: electrode terminal; 100a: second welded portion.

DESCRIPTION OF EMBODIMENTS

The present disclosure will be further described below by means of drawings of the embodiments of the present disclosure. The description about at least one embodiment is merely illustrative, but not intended to limit the present disclosure. Any other embodiments of the present disclosure obtained by those skilled in the art without departing from the scope of the technical solutions of the present disclosure shall fall within the protection scope of the present disclosure.

Techniques, methods and devices known to those skilled in the relevant art will not be discussed in detail, but they should be considered as a part of the description when necessary.

It should be understood that terms indicating orientations or positions, such as "front", "rear", "up", "down", "left", "right", "horizontal", "vertical", "top", and "bottom", etc., generally are used to describe the orientations or positions with reference to the drawings, and are merely intended to simplify the description. That is, these terms should not be construed as a limitation of the present disclosure, since they do not reveal that a component or an element must have a specific orientation or position. The terms "inside" and "outside" indicate the inside and outside of a contour of a component itself.

In the description, the terms "first", "second" and the like used to define a component are merely intended to differentiate a corresponding component from others. Unless otherwise specified, the above terms should not be construed as a limitation of the scope of the present disclosure.

Figure 10:
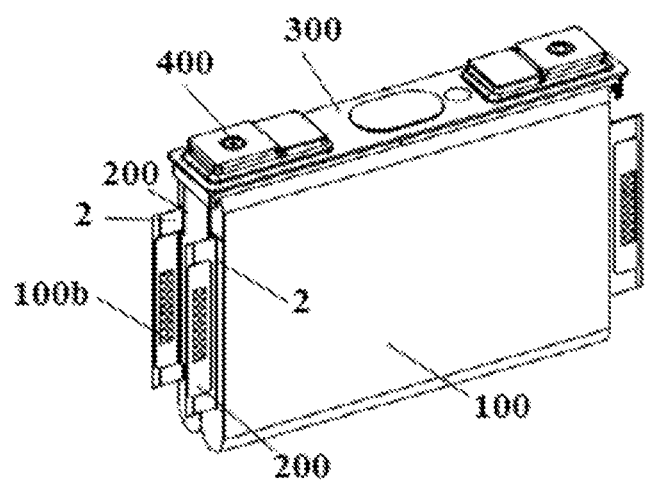
FIG. 10 is a three-dimensional schematic diagram illustrating a structure of a rechargeable battery according to an embodiment of the present disclosure.

To help understand, a basic structure of a rechargeable battery is firstly described with reference to FIG. 10. Referring to FIG. 10, the rechargeable battery mainly includes a housing (not shown), an electrode assembly 100, a current collecting component 200, a top cover 300, and electrode terminals 400. The housing has a cavity with a top opening for accommodating the electrode assembly 100, so as to form a protection of the electrode assembly 100. The electrode assembly 100 accommodated in the housing acts as a core component exerting the charge and discharge function of the rechargeable battery. The top cover 300 covers the opening of the housing. The electrode terminal 400 is disposed on the top cover 300 and exposed at the outside of the top cover 300. The current collecting component 200 is connected between the electrode assembly 100 and the electrode terminal 400 to build an electrical connection between the electrode assembly 100 and the electrode terminal 400.

The electrode assembly 100 is formed by winding or stacking a positive electrode component, a negative electrode component, and a separator disposed between the positive electrode component and the negative electrode component. The positive electrode component and the negative electrode component are usually provided in a sheet-form. Therefore, they are also referred to as a positive electrode plate and a negative electrode plate. The positive electrode component and the negative electrode component each include a current generating portion containing an active material, and a current guiding portion containing no active material. Once the electrode assembly 100 is formed by winding or stacking, a plurality of current guiding portions having the same polarity are laminated together to form tabs. The electrode assembly 100 is connected to the current collecting component 200 through the tabs. The tab of the positive electrode component is a positive tab, while the tab of the negative electrode component is a negative tab. The electrode terminal 400 connected to the positive tab through the current collecting component 200 is referred to as a positive electrode terminal, while the electrode terminal 400 connected to the negative tab through the current collecting component 200 is referred to as a negative electrode terminal. The current collecting component 200 and the tabs can be welded to form a second welded portion 100b, as shown in FIG. 10.

Figure 1:
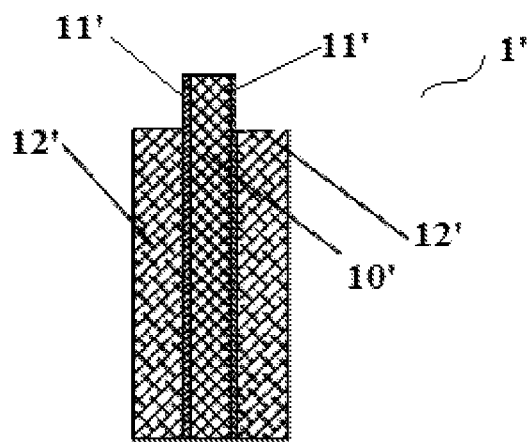
FIG. 1 is a structural schematic diagram of an electrode component including an insulating substrate according to the present disclosure.
Figure 2:
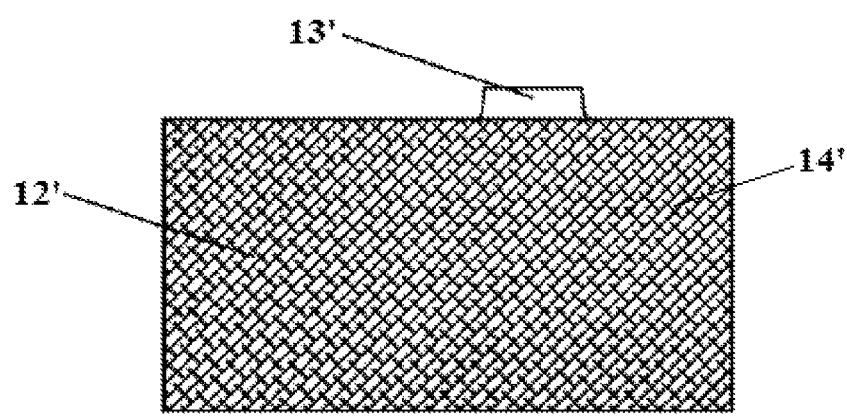
FIG. 2 is a side view of the electrode component shown in FIG. 1.
Figure 3:
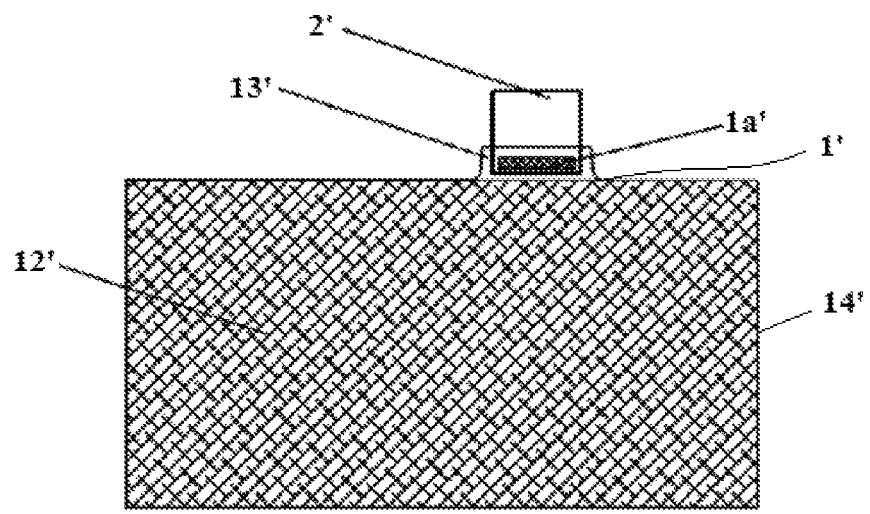
FIG. 3 is a side view of the electrode component shown in FIG. 1 additionally with a conductive structure.

When the electrode assembly 100 is formed by winding or stacking the electrode component shown in FIG. 3, which acts as the positive electrode component and/or the negative electrode component, adjacent current guiding portions can be electrically connected through a conductive structure 2', without the limitation of the insulating substrate 10', so that the electrical conductivity can be effectively improved. However, in the electrode component shown in FIG. 3, the conductive structure 2' is usually connected to a second portion only by welding and the like infirm method. In this way, the conductive structure is easy to be curled up, and thus is unlikely to reliably conduct electricity and also difficult to assemble.

In order to solve the above technical problem, by modifying the electrode component having an insulating substrate and a conductive structure as shown in FIG. 3, the present disclosure provides a novel electrode component, and a new electrode assembly and a rechargeable battery based on the novel electrode component.

FIGS. 1-10 are structural schematic diagrams of an electrode component, an electrode assembly, and a rechargeable battery according to the present disclosure. As shown in FIGS. 1-10, the electrode component provided by the present disclosure includes an electrode body 1, a conductive structure 2 and a reinforcement structure 3. The electrode body 1 includes an insulating substrate 10 and a conductive layer 11 disposed on the surface of the insulating substrate 10. The conductive layer 11 includes a first portion coated with an active material 12, and a second portion extending from the first portion and uncoated with the active material 12. The conductive structure 2 is connected to the second portion and the reinforcement structure 3 serves to fasten the conductive structure 2 on the second portion.

In the present disclosure, by additionally providing the electrode component having the insulating substrate 10 with the reinforcement structure 3 that reinforces the conductive structure 2 connected to the second portion of the conductive layer 11 uncoated with the active material 12, the conductive structure 2 can be more reliably reinforced on the second portion and protected from being curled up, so that the conductive structure 2 can more reliably exert the function of electric conduction.

In the present disclosure, in order to improve the use safety, the reinforcement structure 3 is preferably an electrically insulating structure, since the electrically insulating reinforcement structure 3 can effectively avoid a short circuit caused by arranging the reinforcement structure 3, with compared with a reinforcement structure 3 that is conductive. That is conductive to performing a safer and more reliable charging and discharging process of the rechargeable battery.

The reinforcement structure 3 can adopt various structural forms to fasten the conductive structure 2 on the second portion. For example, the reinforcement structure 3 can include a fastener that is inserted into the conductive structure 2 and the second portion. The reinforcement structure 3 can also at least partially wrap an overlapping region between the conductive structure 2 and the second portion.

The electrode component according to the present disclosure will be further described below in combination with the two embodiments shown in FIGS. 4-6.

A first embodiment is firstly described with reference to FIGS. 4 and 5.

Figure 4:
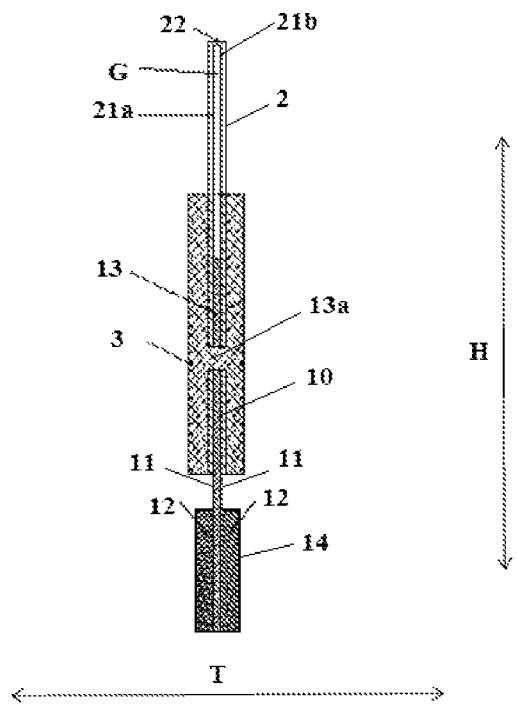
FIG. 4 is a structural schematic diagram of an electrode component according to a first embodiment of the present disclosure.

For convenience of description, T direction shown in FIG. 4 is referred to as a thickness direction, along which the conductive layers 11 are provided on two opposite surfaces of the insulating substrate 10 respectively. That is, in this embodiment, two conductive layers 11 are disposed on two opposite sides of the insulating substrate 10 in the thickness direction. In addition, H direction shown in FIG. 4 is referred to as a height direction, along which the first portion and the second portion are arranged. That is, the height direction is an extending direction of the first portion and the second portion. At the same time, W direction shown in FIG. 5 is referred to as a width direction, which is a direction perpendicular to both the thickness direction T and the height direction H.

Still for convenience of description, the first portion and a portion of the insulating substrate 10 corresponding to the first portion are referred to as a current generating portion 14, and the second portion (also referred to as a conductive portion uncoated with an active material) and a portion of the insulating substrate 10 corresponding to the second portion (also referred to as an insulating portion corresponding to the conductive portion) are referred to as a current guiding portion 13. In other words, in the present disclosure, the electrode body 1 includes the current generating portion 14 and the current guiding portion 13, and the current generating portion 14 and the current guiding portion 13 each include a portion of the insulating substrate 10 and a portion of the conductive layer 11 disposed on the surface of the insulating substrate 10. The difference is in that the conductive layer 11 of the current generating portion 14 is coated with the active material 12, and the conductive layer 11 of the current guiding portion 13 is uncoated with the active material 12. The current generating portion 14 is used to achieve a charge and discharge process through an electrochemical reaction of the active material 12 with electrolytic solution, while the current guiding portion 13 is connected to the current collecting component 200 of the rechargeable battery so as to guide current generated by the current generating portion 14 to the outside. In addition, an current lead-out unit is defined to include the current guiding portion 13 and the conductive structure 2 disposed on the current guiding portion 13, and thus a tab of the rechargeable battery is consisted of at least two current lead-out units that are stacked as a whole.

Figure 5:
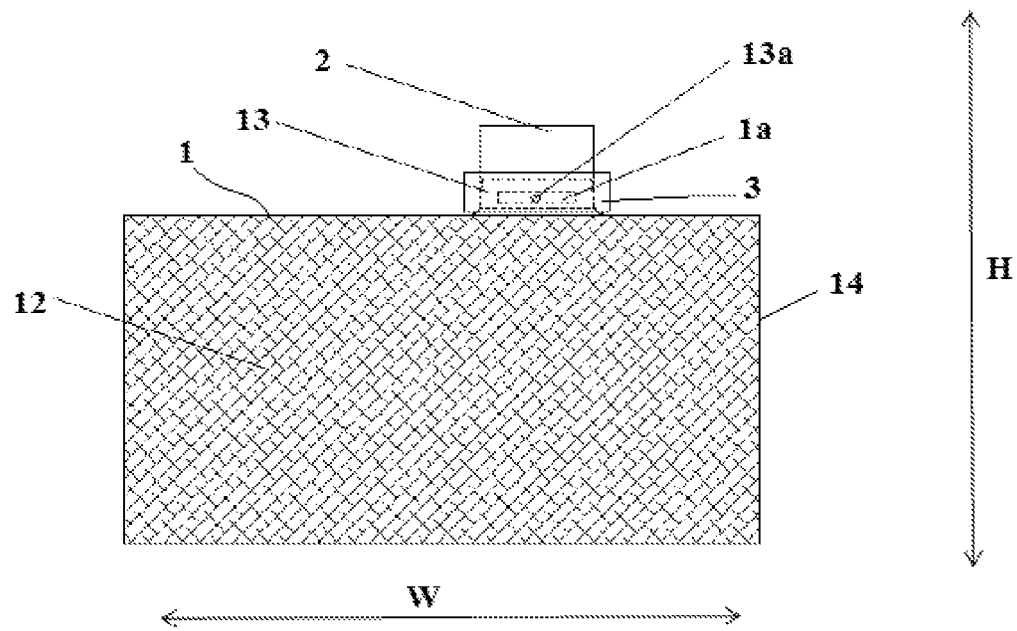
FIG. 5 is a side view of the electrode component shown in FIG. 4.

In the first embodiment as shown in FIGS. 4-5, the electrode component includes an electrode body 1. The electrode body 1 includes an insulating substrate 10 and conductive layers 11 disposed on the two opposite surfaces of the insulating substrate 10. That is, both sides of the insulating substrate 10 are provided with one conductive layer 11, and the insulating substrate 10 is located between the two conductive layers 11. The conductive layer 11 includes a first portion coated with an active material 12 (the lower portion in FIG. 4), and a second portion uncoated with the active material 12 (the upper portion in FIG. 4). The second portion extends from the first portion outwardly (i.e., extending upwardly in FIG. 4).

The insulating substrate 10 can be made of a polymer material which is resistant to electrolyte corrosion, such as PP, PE, PET or PI. The conductive layer 11 can also be a metal substrate such as aluminum or copper substrate. When the electrode component is used as a positive electrode component, the conductive layer 11 can be an aluminum substrate, and when the electrode component is used as a negative electrode component, the conductive layer 11 can be a copper substrate. The conductive layer 11 can be disposed on the surface of the insulating substrate 10 by electroplating, electrophoresis, spraying, dip coating or the like.

In addition, in the embodiment shown in FIG. 4, the conductive structure 2 is connected to the second portion. In other words, the conductive structure 2 is connected to the conductive layer 11 of the current guiding portion 13. In this way, the electrode component can be connected to the current collecting component 200 through the conductive structure 2 to lead the current out, rather than being directly connected to the current collecting component 200 through the conductive layer 11. Therefore, the electrical conductivity and current passing performance of the electrode component can be effectively improved. During the charging and discharging process, current flows from the active material 12 to the second portion of the conductive layer 11 through the first portion of the conductive layer 11, and then flows from the second portion of the conductive layer 11 to the conductive structure 2 connected to the second portion, so that the current can be led by the conductive structure 2 to the current collecting component 200 of the rechargeable battery connected to the conductive structure 2 and is further led out by the current collecting component 200, for example, to the electrode terminal 400 of the rechargeable battery.

The conductive structure 2 and the second portion can be connected by welding or bonding. For example, the conductive structure 2 can be connected to the second portion by ultrasonic welding or conductive adhesive bonding. In the embodiment shown in FIG. 5, the conductive structure 2 is welded to the second portion and thus a first welded portion 1a is formed therebetween. If the lower end of the current guiding portion 13a is too soft, the current guiding portion 13a can be easily bent and thus inserted into the inside of the electrode assembly 100, causing a short circuit. In order to further solve the problem, in this embodiment shown in FIG. 5, the first welded portion 1a is disposed at an end of the second portion close to the first portion. That is, the first welded portion 1a is located at the lower end of the second portion, i.e., the conductive structure 2 is welded to the lower end of the current guiding portion 13. Since the first welded portion 1a has a certain strength, the strength of the lower end of the current guiding portion 13 can be increased by bringing it closer to the lower end of the second portion, so that the current guiding portion 13 can be prevented from being bent and inserted into the electrode assembly due to its too soft lower portion, which would otherwise cause the short circuit, thereby effectively improving the use safety.

In the embodiment shown in FIG. 4, the conductive structure 2 further includes a first conductive member 21a and a second conductive member 21b. The first conductive member 21a and the second conductive member 21b are respectively disposed on two sides of the current guiding portion 13 along the thickness direction (i.e., the thickness direction of the insulating substrate 10, and respectively connected to the conductive layers 11 on two surfaces of the insulating substrate 10 of the current guiding portion 13. That is, the first conductive member 21a is connected to the second portion disposed on one side of the insulating substrate 10, and the second conductive member 21b is connected to the second portion disposed on the other side of the insulating substrate 10.

Since the first conductive member 21a and the second conductive member 21b are respectively disposed on two sides of the current guiding portion 13 in the thickness direction, the electrode assembly 100 including this electrode component has a tab (a positive or negative tab), in which a conductive structure 2 is located between any two adjacent current guiding portions 13 and any two adjacent current guiding portions 13 can be electrically connected through the first conductive member 21a on one of the two adjacent current guiding portions 13 and the second conductive member 21b on the other one of the two adjacent current guiding portions 13. In this way, current can smoothly and sufficiently flow among the respective current guiding portions 13 that are stacked within the tab, and thus the current generated by the electrode assembly 100 can be sufficiently transferred to the current collecting component 200. Since the current flow between the adjacent current guiding portions 13 of the tab is no longer blocked by the insulating substrate 10, the charging and discharging efficiency of the rechargeable battery can be effectively improved, and a risk of overheating of the rechargeable battery during charging and discharging process can be reduced, thereby prolonging the service life of the rechargeable batteries.

The first conductive member 21a and the second conductive member 21b according to the present embodiment are disposed on opposite sides of the current guiding portion 13 in the thickness direction T, so that there is a gap G between the first conductive member 21a and the second conductive member 21b, as shown in FIG. 4. It also can be seen from FIG. 4 that upper ends of the first conductive member 21a and the second conductive member 21b according to the present embodiment are both higher than an upper end of the current guiding portion 13. That is, in the height direction H, an edge of the conductive structure 2 away from the first portion extends beyond an edge of the second portion away from the first portion, so that the electrode body 1 (particularly the current guiding portion 13) only fills a portion of the gap G between the first conductive member 21a and the second conductive member 21b.

Since the electrode body 1 only fills a portion of the gap G between the first conductive member 21a and the second conductive member 21b, space between at least a part of the first conductive member 21a and at least a part of the second conductive member 21b in the height direction H is not filled with the insulating substrate 10. On the one hand, this can achieve an electrical conduction between the conductive layers 11 on both side surfaces in the thickness direction of the insulating substrate 10 through the first electrode component 21a and the second electrode component 21b, thereby further improving current leading-out and conductivity. On the other hand, when connecting the electrode assembly 100 formed by the electrode components to the current collecting component 200 of the rechargeable battery, it is also convenient to reduce the gap G by pressing the first conductive member 21a and the second conductive member 21b so as to closely adhere the first conductive member 21a to the second conductive member 21b. In this way, the current can be more easily transferred from the respective current guiding portions 13 stacked in the tab to the current collecting component 200, thereby improving the conductivity, and the space occupied by the tab can be reduced, which means a better space utilization, thereby facilitating assembling of the electrode assembly 100 and the current collecting component 200.

Further, as shown in FIG. 4, the conductive structure 2 according to this embodiment further includes a conductive connecting portion 22 connected between the first conductive member 21a and the second conductive member 21b. Specifically, in FIG. 4, the lower ends of the first conductive member 21a and the second conductive member 21b are respectively connected to the second portion on the opposite surfaces of the insulating substrate 10 in the thickness direction, while the upper ends of the first conductive member 21a and the second conductive member 21b both are connected by the conductive connecting portion 22, such that the conductive structure 2 is connected to the current guiding portion 13 substantially in an inverted U-shape.

The first conductive member 21a and the second conductive member 21b can be connected as a whole by the conductive connecting portion 22. In this way, even without pressing the first conductive member 21a and the second conductive member 21b together, the current still can be conducted between the first conductive member 21a and the second conductive member 21b. Therefore, the adjacent current guiding portions 13, which are stacked once the electrode assembly 100 is assembled, are electrically conducted, without being affected by the insulating substrate 10, thereby improving the conductivity of the tab.

It should be noted that, in addition to providing the conductive connecting portion 22 to connect the first conductive member 21a and the second conductive member 21b as a whole, the first conductive member 21a and the second conductive member 21b also can be connected directly. In other words, an end of the first conductive member 21a away from the first portion (the upper end in FIG. 4) and an end of the second conductive member 21b away from the first portion (the upper end in FIG. 4) can be connected directly. For example, a copper foil or an aluminum foil, as the conductive structure 2, is bent in the middle and then connected to the conductive layers 11 disposed on the opposite sides of the current guiding portion 13. In this case, two portions of the copper foil or the aluminum foil, which are formed after the bending, act as the first conductive member 21a and the second conductive member 21b, respectively. In this way, the first conductive member 21a and the second conductive member 21b are directly connected in an inverted V shape, such that the electrically conductive structure 2 is connected to the current guiding portion 13 substantially in the inverted V shape.

In order to improve the reliability of the conductive structure 2 arranged on the second portion, the electrode component according to the embodiment shown in FIG. 4 further includes a reinforcement structure 3. The reinforcement structure 3 according to this embodiment reinforces the conductive structure 2 on the second portion by wrapping the overlapping region between the conductive structure 2 and the second portion, so as to enhance the structural firmness of the current lead-out unit.

Specifically, in this embodiment shown in FIG. 4 and FIG. 5, the reinforcement structure 3 is an insulating plastic structure, preferably an insulating plastic film, which winds and wraps two opposite surfaces of the conductive structure 2 in the thickness direction T as well as two opposite surfaces of the current guiding portion 13 and the conductive structure 2 in the width direction W. That is, the reinforcement structure 3 is disposed not only on the first conductive member 21a and but also on the second conductive member 21b, and also disposed on both surfaces of the current lead-out unit in width direction W. The reinforcement structure 3 can be heat-sealed on the current lead-out unit, during which the two opposite surfaces of the conductive structure 2 in the thickness direction T and the two opposite surfaces of the current lead-out unit in width direction W are sequentially wrapped and covered by the reinforcement structure 3, and then the reinforcement structure 3 is heat-sealed on the periphery of the current lead-out unit 3, so as to fasten the conductive structure 2 on the current guiding portion 13.

Based on the above, the reinforcement structure 3, by exerting its reinforcing effect, can fasten the conductive structure 2 on the current guiding portion 13 in such a manner that the conductive structure 2 can be more firmly disposed on the current guiding portion 13 and can be prevented from being curled up.

Further, since the reinforcement structure 3 is a thin insulating plastic film wrapped around the current lead-out unit, the space occupied by the reinforcement structure 3 and an increase in the thickness of the current lead-out unit are relatively small, which can ensure that the electrode assembly 100 still has a small thickness, thereby achieving a miniaturization and weight reduction of the rechargeable battery and guaranteeing a strong charge and discharge capability of the rechargeable battery.

Meanwhile, since the reinforcement structure 3 wraps the conductive structure 2 and the current guiding portion 13, the reinforcement structure 3 can also increase an area and reliability of the contact between the conductive structure 2 and the current guiding portion 13, so as to avoid a situation that the conductive structure 2 and the current guiding portion 13 are only contacted through the first welding portion 1a. In this way, the capability of passing current of the electrode component and the electrical conductivity can be enhanced. In addition, the reinforcement structure 3 also can protect the conductive structure 2 from being destructed, and further prevent debris generated after the destruction of the conductive structure 2 from affecting a normal operating process.

In the embodiment as shown in FIG. 4, in the height direction H, a bottom end of the reinforcement structure 3 is flush to a bottom end of the conductive structure 2, while a top end of the reinforcement structure 3 is higher than a top end of the second portion and lower than a top end of the conductive structure 2. In this way, the reinforcement structure 3 not only surrounds the whole overlapping region between the conductive structure 2 and the second portion, but also wraps a portion of the conductive structure 2 that does not overlap with the second portion, which can more reliably prevent the conductive structure 2 from being curled up with respect to the case where the reinforcement structure 3 only surrounds the overlapping region. The reasons lie in two aspects. In the first aspect, with respect to a case where the bottom end of the reinforcement structure 3 is higher than the bottom end of the conductive structure 2, the reinforcement structure 3 according to the present embodiment can better support the lower portion of the conductive structure 2 and effectively protect the lower portion of the conductive structure 2 from being curled up. In the second aspect, with respect to a case where the top end of the reinforcement structure 3 is lower than the top end of the second portion, the reinforcement structure 3 according to the present embodiment can better support the portion of the conductive structure 2 exceeding the current guiding portion, enhance the strength, and effectively protect the upper portion of the conductive structure 2 from being curled up. Since the reinforcement structure 3 wraps the whole overlapping region between the conductive structure 2 and the second portion, the conductive structure 2 can be in a reliable contact with the second portion, which can enhance the capability of passing current. Further, since the reinforcement structure 3 can avoid the curling-up of the conductive structure 2 in a more reliable way and sufficiently improve the area and reliability of the contact between the conductive structure 2 and the second portion, the conductive structure 2 can fully exert its electrical conducting function, thereby effectively enhancing the electrical conductivity of the electrode component.

At the same time, since the reinforcement structure 3 can better support the lower portion of the conductive structure 2, it together with the first welded portion 1a can effectively prevent the current guiding portion 13 from being bent and inserted into the electrode assembly 100 due to its too soft lower portion, which would otherwise cause the short circuit.

In addition, as shown in FIG. 4 and FIG. 5, in this embodiment, the electrode component is provided with a through-hole 13a that penetrates the conductive structure 2 and the electrode body 1 (specifically, the current guiding portion 13) along the thickness direction. The reinforcement structure 3 has a portion passing through the through-hole 13a. Based on such arrangement, the two opposite portions of the reinforcement structure 3 in the thickness direction T, i.e., two portions of the reinforcement structure 3 located on the first conductive member 21a and the second conductive member 21b in this embodiment, are connected by the portion of the reinforcement structure 3 passing through the through-hole 13a. In this way, the reinforcement structure 3 can be more tightly wrapped around the current lead-out unit, thereby sufficiently fastening the conductive structure 2 on the second portion.

The portion of the reinforcement structure 3 passing through the through-hole 13a can be a separately provided connecting portion or a portion of the reinforcement structure 3 that flows into the through-hole 13a after being melted during the heat-sealing process, the latter one is more convenient to be formed and can result in a firmer connection.

As can be seen from FIG. 5, in the first embodiment, only one through-hole 13a is provided in the electrode component. However, it should be understood that two or more through-holes 13a can be provided. The second embodiment shown in FIG. 6 illustrates an electrode component having a plurality of through-holes 13a.

Differences between the second embodiment and the first embodiment will be described below, and the unmentioned portions can be referred to the foregoing first embodiment.

Figure 6:
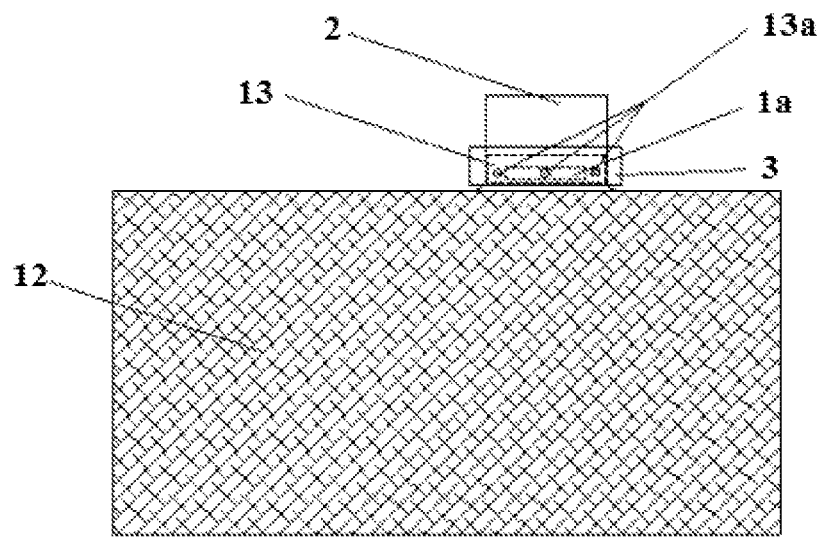
FIG. 6 is a structural schematic diagram of an electrode component according to a second embodiment of the present disclosure.

As shown in FIG. 6, in the second embodiment, the electrode component is provided with three through-holes 13a arranged in a row along the width direction W. With the increase in the number of the through-holes 13a, the reinforcement structure 3 has more portions passing through the through-holes 13a. Therefore, the conductive structure 2 can be much more effectively reinforced with respect to the case where only one or two through-holes 13a are provided.

As a variant in which at least two through-holes 13a are provided, the at least two through-holes 13a can be arranged in a column, or in a matrix, i.e., arranged in rows and columns.

In summary, the electrode component of the present disclosure has a higher structural reliability and electrical conductivity due to the arrangement of the reinforcement structure 3. Therefore, the electrode assembly 100 and the rechargeable battery that are formed by such electrode component can also have the higher structural reliability and electrical conductivity.

When the electrode assembly 100 formed by a plurality of electrode components according to the present disclosure, one, two or more of the plurality of electrode components (including the positive electrode component and the negative electrode component) can be set as the electrode component having the reinforcement structure according to the present disclosure. In order to reinforce the conductive structure 2 of each electrode component in the electrode assembly 100 with the reinforcement structure 3, each electrode component in the electrode assembly 100 should be provided with the reinforcement structure 3. However, in this case where each electrode component in the electrode assembly 100 is provided with the reinforcement structure 3, on the one hand, the structure is complex and the cost is relatively high, and on the other hand, the electrode assembly 100 will be thick, which may negatively affect the assembly and the charge and discharge capability.

In view of the above, the present disclosure also provides another electrode assembly 100, in which the reinforcement structure 3 is arranged on the conductive structure 2 of the at least one current lead-out unit of the tab, so as to reinforce the conductive structure 2 on the second portion. In such electrode assembly 100, the reinforcement structure 3 can only reinforce the conductive structure 2 of one current lead-out unit of the tab, and the number of the reinforcement structures 3 is the same as the number of the current lead-out units so as to reinforce the conductive structure 2 of each current lead-out unit of the tab. This case is similar to the electrode assembly 100 formed by the foregoing electrode component having the reinforcement structure 3 according to the present disclosure. As another example, the reinforcement structure 3 also can reinforce the conductive structures 2 of several current lead-out units of the tab. In this case, all current lead-out units of the tab can be reinforced by a same reinforcement structure 3, or all current lead-out units of the tab are divided into groups and each group of current lead-out units is reinforced by a different reinforcement structure 3. In addition, the reinforcement of the reinforcement structure 3 can be achieved by wrapping the current lead-out unit.

In the following, in combination with the three embodiments shown in FIGS. 7-9, a case where each current lead-out unit of the tab is reinforced by a same reinforcement structure 3 will be further described.

Figure 7:
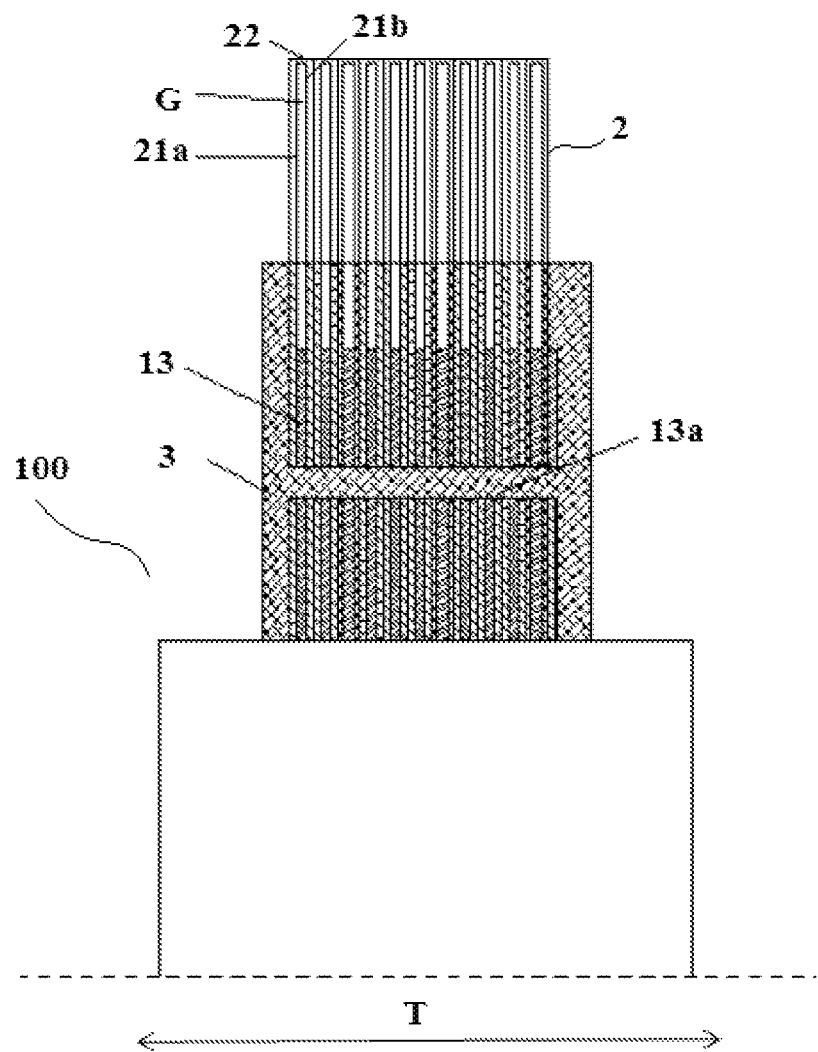
FIG. 7 is a structural schematic diagram of an electrode assembly according to a first embodiment of the present disclosure.
Figure 8:
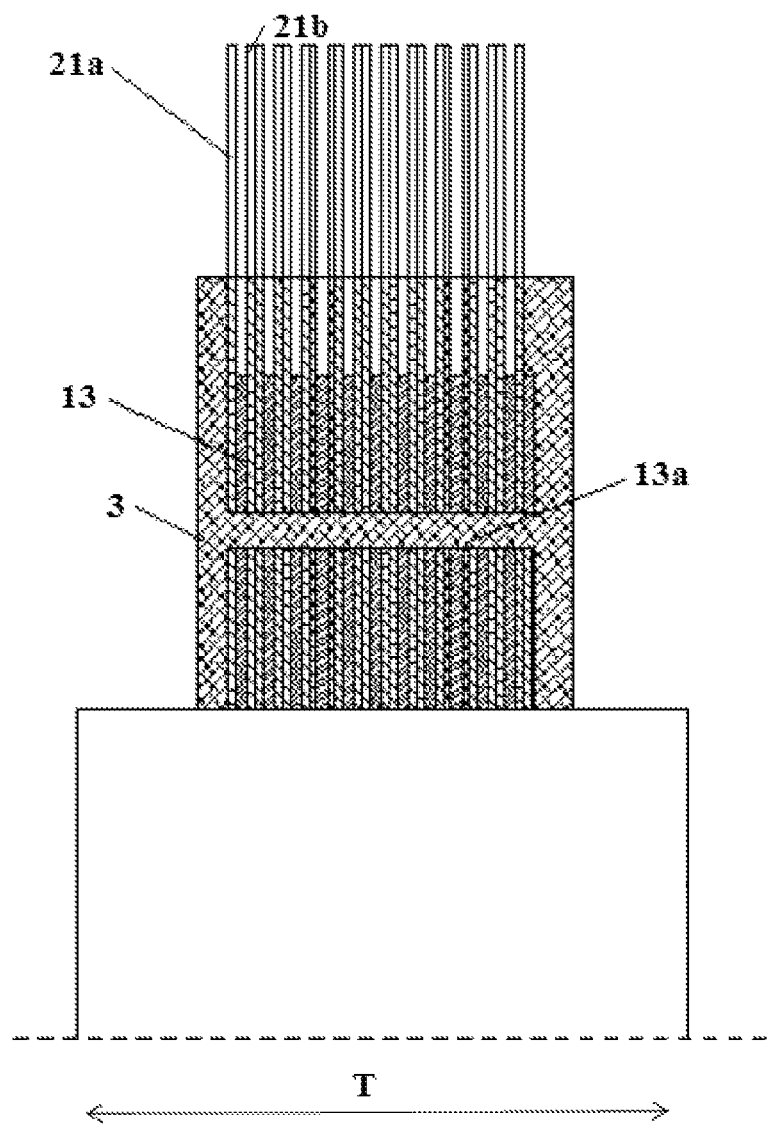
FIG. 8 is a structural schematic diagram of an electrode assembly according to a second embodiment of the present disclosure.
Figure 9:
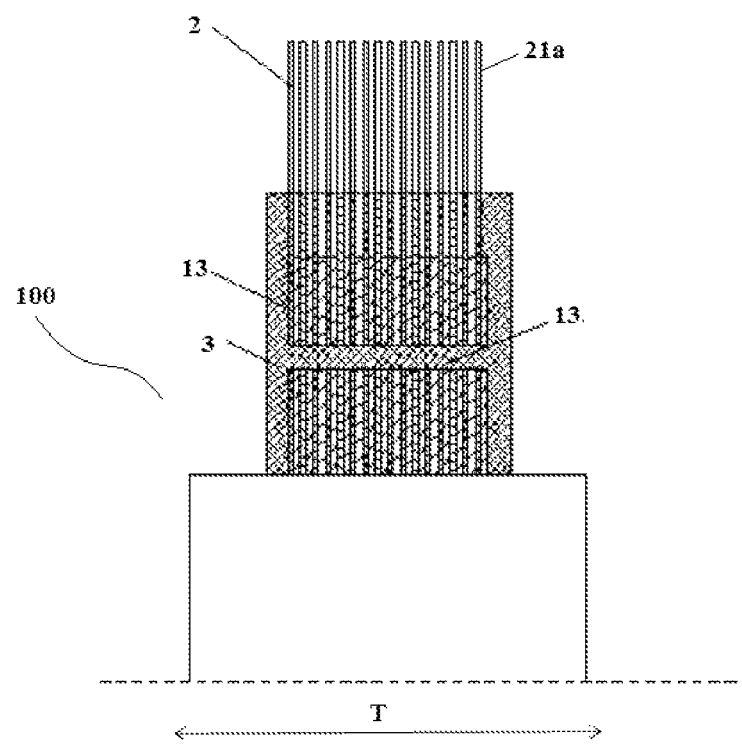
FIG. 9 is a structural schematic diagram of an electrode assembly according to a third embodiment of the present disclosure.

As shown in FIGS. 7-9, the three embodiments are identical in that each of the current lead-out units of the tab is surrounded by the same reinforcement structure 3, the through-hole 13a penetrates each of the current lead-out units of the tab, and each reinforcement structure 3 has the portion passing the through-hole 13a. Since all current lead-out units of the tab requires one reinforcement structure 3 and the reinforcement structure 3 has a portion penetrating all the current lead-out units of the tab, such arrangement has following advantages of: relatively small number of required reinforcement structures 3; simple construction; low cost; small thickness of the electrode assembly 100; easy assembly; efficient and reliable charging and discharging process; and higher strength of reinforcement.

In addition, comparing FIG. 7, FIG. 8, and FIG. 9, a main difference of the three embodiments lies in the specific structure of the conductive structure 2.

In the first embodiment shown in FIG. 7, the conductive structure 2 is the same as the conductive structure 2 shown in FIG. 4, and includes a first conductive member 21a, a second conductive member 21b, and a conductive connecting portion 22.

The second embodiment shown in FIG. 8 differs from the first embodiment shown in FIG. 7 in that conductive structure 2 still includes a first conductive member 21a and a second conductive member 21b, but no longer includes a conductive connecting portion 22. That is, in the second embodiment, the upper end of the first conductive member 21a and the upper end of the second conductive member 21b are independently free ends, instead of being connected by the conductive connecting portion 22. In this way, since the first conductive member 21a and the second conductive member 21b are no longer supported by the conductive connecting portion 22, they can be close to one another by exerting an external force, so that the first conductive member 21a and the second conductive member 21b of the conductive structure 2 can be more tightly pressed and the gap G therebetween can be eliminated when connecting the electrode assembly 100 to the current collecting component 200. Therefore, the electrical conductivity can be enhanced and less assembly space is required, and thus the electrode assembly 100 can be more efficiently assembled with the current collecting component 200.

In the third embodiment shown in FIG. 9, the conductive structure 2 still includes the first conductive member 21a, but no longer includes the second conductive member 21b and the conductive connecting portion 22. Each first conductive member 21a is disposed on the second portion at the same surface of the insulating substrate 10 in the thickness direction. In this way, a size of the conductive structure 2 in the thickness direction T can be effectively reduced while providing sufficient passing current. This can further reduce the space occupied by the tab, thereby increasing the space utilization of the electrode assembly 100, and reduce the assembly difficulty of the electrode assembly 100 with other structural components of the rechargeable battery.

It should be understood that, the variants of the conductive structure 2 shown in FIGS. 8 and 9 also can be applied to the electrode component aforementioned in combination with FIGS. 4-6.

The embodiments of the present disclosure discussed above are merely illustrative, but not intended to limit the present disclosure. Any modifications, equivalent replacements, improvements within the spirit and principles of the present disclosure should be included in the scope of protection of the present disclosure.

What is claimed is:

1. An electrode component, comprising:
   an electrode body;
   a conductive structure; and
   a reinforcement structure,
   wherein the electrode body comprises an insulating substrate and a conductive layer disposed on two opposite surfaces of the insulating substrate in a thickness direction of the insulating substrate, and the conductive layer comprises a first portion coated with an active material, and a second portion extending from the first portion and uncoated with the active material, and the reinforcement structure reinforces the conductive structure on the second portion, and wherein the conductive structure comprises a first conductive member and a second conductive member, the first conductive member is connected to a part of the second portion disposed on one surface of the insulating substrate, and the second conductive member is connected to a part of the second portion disposed on the other surface of the insulating substrate, and the reinforcement structure is provided on a surface of the first conductive member facing away from the part of the second portion disposed on one surface of the insulating substrate, the reinforcement structure is further provided on a surface of the second conductive member facing away from the part of the second portion disposed on the other surface of the insulating substrate, and the reinforcement structure is an insulating plastic structure.

2. The electrode component according to claim 1, wherein an overlapping region is formed between the conductive structure and the second portion, and the reinforcement structure at least partially wraps the overlapping region.

3. The electrode component according to claim 1, wherein the electrode component is provided with a through-hole, the through-hole penetrating the conductive structure and the electrode body along a thickness direction, and the reinforcement structure further has a portion passing through the through-hole.

4. An electrode assembly, comprising:
   a tab; and
   a reinforcement structure,
   wherein the tab comprises at least two current lead-out units that are stacked together, and each of the at least two current lead-out units comprises a current guiding portion and a conductive structure, and the current guiding portion comprises a conductive portion uncoated with an active material and an insulating portion corresponding to the conductive portion, the conductive portion being disposed on the insulating portion, and wherein the conductive structure comprises a first conductive member, a second conductive member and a conductive connection portion, the first conductive member is connected to a part of the conductive portion disposed on one surface of the insulating portion, the second conductive member is connected to a part of the conductive portion disposed on the other surface of the insulating portion, and the conductive connecting portion is connected between the first conductive member and the second conductive member, the reinforcement structure is arranged on the conductive structure of at least one of the at least two current lead-out units of the tab, and reinforces the conductive structure on the conductive portion, and the reinforcement structure is an insulating plastic structure.

5. The electrode assembly according to claim 4, wherein an overlapping region is formed between the conductive structure and the conductive portion, and the reinforcement structure at least partially wraps the overlapping region.

6. The electrode assembly according to claim 5, wherein all of the at least two current lead-out units of the tab are wrapped by a same reinforcement structure, or
the at least two current lead-out units of the tab are divided into at least two groups of current lead-out units, each group of the at least two groups of current lead-out units being wrapped by a different reinforcement structure.

7. The electrode assembly according to claim 4, wherein one of the at least two current lead-out units, which corresponds to the conductive structure reinforced by the reinforcement structure, is provided with one or more through-holes, each of the one or more through-holes penetrating the corresponding current lead-out unit along a thickness direction, and the reinforcement structure has a portion passing through one of the one or more through-holes.

8. The electrode assembly according to claim 7, wherein the one or more through-holes are at least two through-holes, and the at least two through-holes are arranged in a row and/or a column.

9. A rechargeable battery, comprising an electrode assembly, wherein the electrode assembly comprises:
a tab; and
a reinforcement structure,
wherein the tab comprises at least two current lead-out units that are stacked together, and each of the at least two current lead-out units comprises a current guiding portion and a conductive structure, and the current guiding portion comprises a conductive portion uncoated with an active material and an insulating portion corresponding to the conductive portion, the conductive portion being disposed on the insulating portion, and wherein the conductive structure comprises a first conductive member, a second conductive member and a conductive connection portion, the first conductive member is connected to a part of the conductive portion disposed on one surface of the insulating portion, the second conductive member is connected to a part of the conductive portion disposed on the other surface of the insulating portion, and the conductive connecting portion is connected between the first conductive member and the second conductive member, the reinforcement structure is arranged on the conductive structure of at least one of the at least two current lead-out units of the tab, and reinforces the conductive structure on the conductive portion, and the reinforcement structure is an insulating plastic structure.

10. The rechargeable battery according to claim 9, wherein an overlapping region is formed between the conductive structure and the conductive portion, and the reinforcement structure at least partially wraps the overlapping region.

11. The rechargeable battery according to claim 10, wherein all of the at least two current lead-out units of the tab are wrapped by a same reinforcement structure, or
the at least two current lead-out units of the tab are divided into at least two groups of current lead-out units, each group of the at least two groups of current lead-out units being wrapped by a different reinforcement structure.

12. The rechargeable battery according to claim 9, wherein one of the at least two current lead-out units, which corresponds to the conductive structure reinforced by the reinforcement structure, is provided with one or more through-holes, each of the one or more through-holes penetrating the corresponding current lead-out unit along a thickness direction, and the reinforcement structure has a portion passing through one of the one or more through-holes.

13. The rechargeable battery according to claim 12, wherein the one or more through-holes are at least two through-holes, and the at least two through-holes are arranged in a row and/or a column.

* * * * *